United States Patent Office 2,695,228
Patented Nov. 23, 1954

2,695,228

PROCESS OF PURIFYING INDIUM USING A GALVANIC PRECIPITANT

Yurii E. Lebedeff, Metuchen, William C. Klein, Menlo Park, and John R. Stone, Fords, N. J., assignors to American Smelting and Refining Company, New York, N. Y., a corporation of New Jersey No Drawing. Application January 31, 1952, Serial No. 269,333

6 Claims. (Cl. 75—109)

This invention relates to the production of indium substantially free of metals which are difficultly separated from indium by pyrometallurgical procedures. More particularly, it relates to a process in which such difficultly separable metals are precipitated from impure indium solutions by galvanic precipitation.

Heretofore, pyrometallurgical processes (so-called kettle processes) have been used to separate, from indium and indium-bearing materials, metals and metal values that are undesirably present therein. Such processes are effective for the separation of "kettle-removable" metals which include all of the metals above indium in the electromotive series of metals, and some of the metals below indium in this series.

Pyrometallurgical processes, however, are generally ineffective for the removal of other of the metals below indium in the electromotive series. Such metals are lead, tin, bismuth and silver and are referred to herein as metals difficultly removable from indium by pyrometallurgical processes or difficultly removable or separable metals. Silver and bismuth can be removed from indium only with great difficulty by such processes and these processes are ineffective, for all practical purposes, for the removal of lead and tin. Consequently, indium, free of or having a desirably low content of the difficultly removable metals, could not be produced commercially, heretofore, from indium-bearing materials containing these metals.

The principal object and advantage of the invention is to provide a simple, practical and economical process for the separation from indium of metals removable therefrom with difficulty by pyrometallurgical processes. Another object is to provide a process for separating such metals, especially lead or tin or both, from indium when they are present therein in small quantities. Other objects and advantages will be apparent to those skilled in the art from the following detailed description of the invention.

Broadly, the invention comprehends establishing an impure indium solution having dissolved therein at least one metal which is difficultly removable from indium by pyrometallurgical processes and purifying the solution of the difficultly removable metal with a partial galvanic precipitant. This is accomplished by adding to the solution a galvanic precipitant comprising a metal having a position in the electromotive series higher than that of thallium in an amount sufficient to precipitate by its galvanic action substantially all of the difficultly removable metal but insufficient to precipitate appreciable quantities of indium from the solution.

The precipitant is maintained in contact with the solution, preferably with agitation, for a time sufficient to precipitate the difficultly separable metal. Generally, this is accomplished in a period of about one-half hour to an hour, although shorter or longer periods up to about five hours or more may also be used. Thereafter, the resulting precipitate may be separated from the solution. Indium substantially free of difficultly removable metal may then be recovered from the thus purified solution in any suitable manner. This may be accomplished, for example, by electrolysis of the purified solution. Preferably, however, the indium is recovered by galvanically precipitating it from the solution in the manner described more fully hereinafter.

In conducting the purification, the galvanic precipitant need not be a pure metal and may even be contaminated with one or more of the difficultly removable metals. Where difficultly removable metals are introduced with the precipitant, they become insoluble in the solution, or if dissolved, are likewise precipitated therefrom; in either event, they are removed with the precipitate. This feature is one of the advantages of the invention.

Indium itself may be used as the galvanic precipitant; however, for best results, the precipitant is a metal higher than chromium in the electromotive series. The preferred metals are aluminum, zinc, magnesium and manganese. Of these metals, aluminum is the most preferred since the cost per pound of the precipitated metal is lowest when it is used.

Although indium solutions containing any amount of a difficultly removable metal or metals may be purified by the process, it is particularly effective for indium solutions containing a minor amount of the difficultly separable metal or metals especially solutions containing less than two grams per liter, and more particularly solutions containing less than one gram per liter, and preferably less than .5 gram per liter, in the aggregate of the difficultly separable metals.

The impure indium solution is preferably an aqueous acid solution and one having an acidity of about 1–10 grams of acid per liter. Any suitable acid such as sulphuric, hydrochloric, or acetic acid may be used to establish the indium-bearing solution and the preferred excess acidity therein.

The amount of the galvanic precipitant added to any particular impure indium solution will depend upon the amount of difficultly removable metal therein, and also upon the amount of other dissolved metals lower than indium in the electromotive series. When a metal higher than indium in the electromotive series is added as a precipitant, the amount so used will also depend upon the economically acceptable amount of indium that is precipitated with the difficultly removable metals. It should be noted that in this latter case the indium-containing metal precipitate may be re-dissolved and added to other solutions to be purified. Alternatively, the precipitate, if it contains sufficient indium and metals above it in the electromotive series, may also be used as the galvanic precipitant. In general, for most indium solutions that are encountered, the metal precipitant is added to the solution in amounts up to about 5–15% of the equivalent weight of the indium content of the solution. Preferably, it is added in amounts of about 1 to 4 times the equivalent weight of the aggregate amount of difficultly separable metal and may be added in amounts of up to 10 times this equivalent weight when the difficultly separable metals are present in very small amounts.

The process as described herein may be conducted at atmospheric, super or sub atmospheric pressure and at any temperature between the freezing point of the impure indium solution up to and including its boiling point. Preferably, it is conducted at atmospheric pressure and at temperatures in the range of about 20–80° C. It has been found that the removal of lead, especially in the absence of the enhancing agents disclosed hereinafter, is increased at lower temperatures which desirably and preferably are in the range of 20–40° C. On the other hand, the removal of tin is increased, particularly in the absence of the enhancing agents, at higher temperatures which preferably are in the range of 40–80° C. The removal of silver and bismuth are not appreciably affected by temperature.

It has been found also that the removal of each of the difficultly separable metals may be enhanced by the presence in the indium solution of one or more additional metal or metals which is lower than indium in the electromotive series of metals, including a difficultly separable metal or metals. It is desirable, therefore, that the impure solution contain a plurality of metals lower than indium in the electromotive series, at least one of which is a difficultly separable metal. Preferably, however, in addition to at least one difficultly separable metal, the solution also contains at least one additional metal lower than indium in the electromotive series of metals other than a difficultly separable metal.

While good results are obtained by the presence of the additional metal or metals, they are not all equally effective in enhancing the removal of each of the difficultly separable metals. In the removal of silver or bismuth, each of the specified additional metals is substantially equally effective. In the removal of lead or tin, however, there are substantial differences in the effect of the various specified additional metals.

For the removal of lead, it has been found that tin is the most effective of the difficultly separable metals. Tellurium, arsenic, copper, antimony, mercury, nickel and iron are the most effective of the specified metals other than a difficultly separable metal and they are the preferred metals for the removal of lead. In contrast, but not by way of limitation or exclusion herein, antimony, copper, nickel and mercury are the most effective of the specified metals other than a difficultly separable metal for the removal of tin. Of the difficultly separable metal, silver is more effective than lead although each is very effective in the removal of tin. Therefore, the members of the group comprising antimony, copper, silver, nickel, lead and mercury are preferred for the removal of tin.

With indium solutions containing both lead and tin as well as such solutions containing silver or bismuth or both, the presence of antimony is preferred when it is desired to remove each of the difficultly separable metals in one partial galvanic precipitation step which preferably, also, is conducted at temperatures in the range 40–80° C. and especially at about 60° C. The removal of the difficultly separable metals from such indium solutions may also be accomplished in a plurality of partial galvanic precipitation steps conducted at different temperatures and in the presence of a different additional metal or metals.

When the above discussed additional metal or metals are not present in the impure indium solution, they may be added thereto before, during or after the addition of the galvanic precipitant. They may be present or added to the solution as such or as an alloy or alloys or in the form of a compound or compounds. For best results, however, they are dissolved in the solution. The amount of the additional metal or metals in the aggregate is preferably about 10–150% by weight of the amount of the galvanic precipitant used and generally from about 1 to 15 times the aggregate weight of the difficultly separable metals present. Greater or lesser amounts may be used depending upon the amount of difficultly removable metal present and the specific amount and kind of galvanic precipitant used.

It has been found further that the addition of chemical reagents to the impure indium solution enhance the removal therefrom of the difficultly separable metals. Organic compounds, particularly proteinaceous materials such as glue, gelatin or casein and the like, effectively enhance the removal of such metals. Insoluble inorganic compounds are also effective; and this is particularly true of barium or strontium sulphate or mixtures thereof, especially for the removal of lead or tin or both.

For best results, the insoluble inorganic compounds are formed in the solution. Thus, for example, a reactive salt of barium or strontium may be added to the solution and precipitated therein by the sulphate values present or added to the solution. The chemical reagent or reagents may be added before, during, or after the addition of the galvanic precipitant. Preferably, they are added after the galvanic metal has precipitated the bulk of the difficultly separable metal and within about one-half to one hour after the addition of the galvanic precipitant. In this preferred procedure, the solution is agitated for a half hour to an hour or more after the addition of the reagent.

The amount of chemical reagent that may be added to the solution depends upon the concentration of the difficultly removable metals therein. In general, for most impure indium solutions encountered, proteinaceous compounds in amounts up to about 5 grams per liter or more, preferably up to about 2 grams per liter, and inorganic compounds up to about 20 grams per liter or more, preferably up to about 10 grams per liter may be used.

In practicing the invention, the presence of an additional metal or metals lower than indium in the electromotive series, or the chemical reagents or both, may be used to enhance the removal of the difficultly separable metals. It has been found that when chemical reagents are not used, the metallic precipitate of the difficultly separable metals formed by the addition of the galvanic precipitant tends to re-dissolve in the solution. The amount of such metal that is re-dissolved and the rate of re-solution appears to be a function of the time of contact between the metallic precipitate and the solution, the acidity of the solution, the particle size of the precipitate, the particular metal or metal present in the metallic precipitate and the amount and kind of anions present in the solution. Any such re-dissolved metal may contaminate the indium product that is subsequently recovered from the purified indium solution especially where the indium is recovered by a galvanic precipation. Contamination due to re-solution may occur when, for any reason there is prolonged contact between the metallic precipitate and the solution such as may take place when a difficultly filterable precipitate is formed.

It has been found also that the rate of resolution of the metallic precipitate may be inhibited or greatly reduced by the use of the chemical reagents. For best results in removal of difficultly separable metal, especially lead and tin, both types of the enhancing agents are used in conjunction with the galvanic precipitant, i. e. both a chemical reagent and an additional metal lower than indium in the electromotive series of metals.

When a chemical reagent is used in the process, temperatures in the range of about 20–80° C. are preferred, although higher or lower temperatures may also be used. The removal of lead as well as silver and bismuth are relatively unaffected by temperature with the use of a chemical reagent. Their removal takes place equally well in both the higher and lower temperatures in this range. The removal of tin on the other hand, whether or not a chemical reagent is used, is favored by the use of higher temperatures. For tin removal temperatures in the range of about 40–80° C. and especially in the range 50–65° C. are preferred. Accordingly, when tin is present in the solution the process is most effectively conducted using these preferred tin removal temperatures and both types of enhancing agents.

The indium remaining in the solution which has been thus purified to remove the difficultly separable metals may be recovered in any suitable manner such as, for example, by electrolyzing the solution to deposit the indium therein on a cathode. Preferably, however, the indium is recovered from the solution by galvanic precipitation.

In accordance with the preferred process, a galvanic precipitant higher than indium, and preferably higher than chromium in the electromotive series of metals, is added to the solution in sufficient quantity to precipitate the indium therein. The thus precipitated indium is then separated and recovered from the solution. Thereafter, the recovered indium may be kettle processed, if desired, to separate kettle-removable metals that may be present, including the galvanic precipitate.

Aluminum, zinc, magnesium and manganese are the preferred metals for galvanically precipitating the indium from the purified solution. Of these metals, aluminum is again the most preferred, both because the cost per pound of precipitated metal is lowest when it is used and also because commercial aluminum is available which is free of the difficultly separable metals.

When aluminum is used as the galvanic precipitant, it is desirable that the solution have, or be adjusted to have, a chloride content of about 30–90 grams per liter of chlorine as chloride. Although greater or lesser amounts or no chloride need be present when aluminum is used, the presence of the amounts indicated insures the formation of a desirably coalescent metallic precipitate.

This galvanic precipitant need not be the same as that used in the purification step. It, however, should be free of the difficultly removable metal or metals since any such metal introduced into the solution with the precipitant at this point will contaminate the recovered indium. For purposes of recovering the indium, the galvanic metal may be considered to be free of difficultly removable metal or metals when its content of such metal or metals is insufficient to contaminate the recovered indium beyond acceptable limits. For example, if indium of 99.9% purity is to be produced, aluminum containing not in excess of about 0.15% by weight in the aggregate of difficultly separable metals may be used. Correspondingly, zinc containing not in excess of 0.05% and magnesium containing not in excess of 0.10% in the aggregate of the difficultly removable metals may also be used. Galvanic precipitants containing lower amounts of these metals are preferred in general and are used particularly where a final indium product of higher purity is desired.

The invention is further illustrated in the following specific examples. It should be understood, however, that the examples are given for purposes of illustration and the invention in its broader aspects is not limited thereto.

EXAMPLE 1

1000 cc. of an indium solution having the following analyses was prepared:

In = 50 gms./l.
Cl⁻ = 90 gms./l.
$H_2SO_4$ = 6 gms./l.
Pb = 0.045 gm./l.
Sn = 0.080 gm./l.

The solution was heated to 45–50° C., after which 14 grams of aluminum powder substantially free of difficultly separable metals was added and the mixture was stirred for one hour to coalesce the spongy precipitate that was formed. The mixture was then filtered and the filtrate was found to contain 0.1 gram per liter of indium. The wet metallic sponge-precipitate separated by the filtration was fused with a caustic solution containing 35 grams of sodium hydroxide and 35 cc. water. The caustic residue was then treated at room temperature with additional water to remove the aluminum and caustic content of the product. The supernatant solution was separated by decantation and was found to contain 1 gram of indium. 49 grams of indium metal remained after the caustic treatment and had the analyses as follows:

In = 98%
Pb = 0.1%
Sn = 0.16%

It will be noted that essentially all of the lead and tin in the original solution is contained in the metallic indium sponge product.

EXAMPLE 2

To 1000 cc. of an indium solution having the analyses set forth in Example 1 were added 1.2 grams of aluminum powder. The mixture was stirred for one-half hour at 60–70° C. and filtered while maintaining the temperature in this range. An impure sponge residue, amounting to 3.7 grams on the dry basis and analyzing 80% indium, was recovered from the filtration. The residual solution was cooled to 45–50° C. and to it was added 13 grams of aluminum powder substantially free of lead and tin. The mixture was stirred for one hour to coalesce the spongy precipitate and was then filtered. The filtrate was found to contain 0.1 gram per liter of indium. Thereafter, the wet metallic sponge precipitate separated by this filtration was treated with caustic solution in the manner set forth in Example 1. The caustic solution removed from the metallic sponge was found to have a total indium content of about one gram. 46 grams of indium metal remained after the caustic treatment and had the following analyses:

In = 98%
Pb = .03%
Sn = .03%

It will be noted that 66.6% of the lead and 81.4% of the tin content of the original impure indium solution were removed by the partial galvanic precipitation and that the final indium metal product is considerably lower in these constituents than is Example 1.

EXAMPLE 3

To 1000 cc. of an indium-bearing solution having analyses set forth in Example 1 was added 0.5 gram of copper as $CuSO_4.5H_2O$ and 1.2 grams of aluminum powder. The mixture was stirred for one-half hour while maintaining a temperature of 30° C. and then filtered at these temperatures. The impure spongy precipitate formed during this period was separated by filtration and was found to amount to 2.6 grams of spongy material on a dry basis and analyzed about 60% indium.

After adjusting the temperature of the solution to 45–50° C., 13 grams of aluminum powder, substantially free of lead and tin, were added and the mixture was stirred for one hour at these temperatures and then filtered. The filtrate was found to contain 0.1 gram per liter of indium. The spongy metallic residue from the filtration was then treated with caustic solution as set forth in Example 1. The caustic solution separated from the sponge was found to contain about one gram of indium. 47 grams of indium metal remained after the caustic treatment and had the following analyses:

In = 98+%
Pb = 0.008%
Sn = 0.015%

92% and 90% of the lead and tin respectively, that were present in the original solution were removed by the partial precipitation. It will be noted that the presence of copper in the indium solution markedly enhanced the separation of the lead and the tin from the indium.

EXAMPLE 4

Example 3 was duplicated with the exception that after the copper and first aluminum addition, the mixture was stirred for five hours at 60–70° C. before the impure spongy precipitate was separated from the solution. 48 grams of final indium metal was obtained which had the following analyses:

In = 98+%
Pb = 0.07%
Sn = 0.021%

It will be seen that the prolonged period of contact between the impure metal sponge and the solution during the first step of the process resulted in a higher lead and tin content in the final indium product and a removal of 22.3% of the lead and 86.9% of the tin present in the original solution.

EXAMPLE 5

1000 cc. of an impure indium solution having an analyses as set forth in Example 1 was prepared. To this solution was added 0.5 gram of copper as $CuSO_4.5H_2O$, 1.2 grams of aluminum powder, 11.5 grams of barium carbonate and, as a filter aid, 3 grams of calcium chloride. The mixture was stirred for five hours while maintaining a temperature of 60–70° C., after which time it was filtered while maintaining these temperatures and then washed. The precipitate separated by the filtration weighed about 17.2 grams on a dry basis and contained approximately 5% indium. The filtrate was adjusted to 45–50° C. and to it were added 13 grams of aluminum powder which was substantially free of lead and tin. The mixture was stirred for one hour to coalesce the sponge and was then filtered. The filtrate was found to contain 0.1 gram liter of indium.

The metallic sponge residue obtained from the filtration after the second precipitation with aluminum was then treated with the caustic solution in the manner indicated in Example 1. The residual indium metal weighed 48 grams and had the following analyses:

In = 98+%
Pb = .001%
Sn = 0.001%

It will be observed that the lead and tin content of the indium metal product is extremely low and that 99.9% of the lead and 99.9% of the tin were removed, even though there was prolonged contact between the solution and the impure metal sponge resulting from the first precipitation step.

In each of the following examples, the results of which are given in Table I, 1000 cc. of indium solution was prepared having dissolved therein 50 grams of indium, 6 grams of excess acid, and the additional metals indicated in each case in the table. In all of the examples except 28 and 29, the indium and the additional metals were present as sulphates, the excess acid was $H_2SO_4$ and 67 grams of sodium chloride were added. Examples 28 and 29 were the same except that no sodium chloride was added. In Examples 37 and 38, sufficient additional acid was added to maintain a final excess acidity of 6 grams per liter.

The temperature of each solution was adjusted to that indicated in the table and while at this temperature was purified by adding thereto 1.2 grams of aluminum powder and chemical reagent as indicated. Each solution then was stirred for the length of time set forth in the table, after which it was filtered. The temperature of the filtrate was adjusted to 45–50° C. and 11 grams of aluminum powder substantially free of difficultly separable metal was added to each solution. After the aluminum powder was stirred into each solution and reacted, it was filtered while hot to recover the precipitated indium. Each of the indium precipitates thus formed was treated with caustic solution as described in Example 1 to recover the indium product. The removal of the difficultly separable metal or metals during the partial precipitation in each case was as indicated in the table in the column entitled "percent removal."

ample 1. 33 grams of indium metal was recovered and had the following analyses:

$$Pb = .01\%$$
$$Sn = 0.020\%$$

A total of 93% of the lead and 91.5% of the tin content of the original impure indium solution were removed by the two partial galvanic precipitation steps.

The impure indium solution upon which the process of the invention is practiced may be prepared in any suitable manner from any suitable starting material. For example, an aqueous indium-bearing solution may Table I

| Example | Composition of Solution in grs./Ltr. | | | Galvanic Precipitation | | | Percent Removal | | |
|---|---|---|---|---|---|---|---|---|---|
| | Pb | Sn | Other Metal | Chemical Reagent | Temp., °C. | Hours Stirring Time | Pb | Sn | Other Metal |
| 6 | .045 | | | | 60 | ½ | 26.6 | | |
| 7 | .045 | | | | 30 | ½ | 86.6 | | |
| 8 | | .08 | | | 30 | ½ | | 29.1 | |
| 9 | | .08 | | | 60 | ½ | | 67.0 | |
| 10 | .045 | .08 | | | 60 | ½ | 62.3 | 81.5 | |
| 11 | .045 | | 0.5Cu | | 60 | ½ | 98.6 | | |
| 12 | | .08 | .5Cu | | 60 | ½ | | 83.8 | |
| 13 | .045 | .08 | .5Cu | | 30 | ½ | 97.0 | 94.0 | |
| 14 | .045 | .08 | .5Te | | 60 | ½ | 99.5 | 43.2 | |
| 15 | .045 | .08 | .5As | | 60 | ½ | 99.3 | 65.0 | |
| 16 | .045 | .08 | .7Sb | | 60 | ½ | 94.7 | 95.8 | |
| 17 | .045 | .08 | .1Hg | | 60 | ½ | 93.5 | 76.4 | |
| 18 | .045 | .08 | .5Ni | | 60 | ½ | 92.4 | 85.0 | |
| 19 | .045 | .08 | .5Fe | | 60 | ½ | 82.2 | 34.0 | |
| 20 | .045 | .08 | .5Co | | 60 | ½ | 77.3 | 45.0 | |
| 21 | .045 | .08 | .5Tl | | 60 | ½ | 66.6 | 64.2 | |
| 22 | .045 | .08 | .5Bi | | 60 | ½ | 54.7 | 53.4 | 99.5Bi |
| 23 | .045 | .08 | .5Cu | | 60 | ½ | 47.2 | 94.0 | |
| 24 | .045 | .08 | .5Ag | | 60 | ½ | 38.7 | 92.4 | 99.6Ag |
| 25 | | | .1Bi | | 60 | ½ | | | 98.9Bi |
| 26 | | | .5Bi<br>.5Cu | | 60 | ½ | | | 99.9Bi |
| 27 | | | .1Bi<br>.7Sb | | 60 | ½ | | | 99.7Bi |
| 28 | | | .5Cu<br>.1Ag | | 60 | ½ | | | 100 Ag |
| 29 | | | .7Sb<br>.1Ag | | 60 | ½ | | | 99.7Ag |
| 30 | .045 | .08 | .5Cu<br>.5Sb | | 60 | ½ | 99.2 | 98.2 | |
| 31 | .045 | .08 | | 12 gr. BaCl₂.2H₂O | 60 | 5 | 99.9 | 98.9 | |
| 32 | .045 | .08 | | 12 gr. BaCl₂.2H₂O | 60 | ½ | 95.6 | 98.8 | |
| 33 | .045 | .08 | | 12 gr. BaCl₂.2H₂O | 30 | ½ | 99.3 | 64.1 | |
| 34 | .045 | .08 | | 18 gr. SrCl₂.6H₂O | 60 | 5 | 99.9 | 98.9 | |
| 35 | .045 | .08 | | 18 gr. SrCl₂.6H₂O | 60 | ½ | 99.3 | 96.2 | |
| 36 | .045 | .08 | | 18 gr. SrCl₂.6H₂O | 30 | ½ | 95.6 | 15.6 | |
| 37 | .045 | .08 | .5Cu | 10 gr. BaCO₃ | 60 | 5 | 99.7 | 100.0 | |
| 38 | .045 | .08 | .7Sb<br>.5Cu | 10 gr. BaCO₃ | 60 | 5 | 99.9 | 100.0 | |
| 39 | .045 | .08 | .5Cu | 12 gr. BaCl₂.2H₂O | 60 | 5 | 99.8 | 98.8 | |
| 40 | .045 | .08 | .5Cu | 18 gr. SrCl₂.6H₂O | 60 | 5 | 99.1 | 97.2 | |
| 41 | .045 | .08 | .7Sb<br>.5Cu | 18 gr. SrCl₂.6H₂O | 60 | 5 | 99.5 | 99.7 | |
| 42 | .045 | .08 | | 2 gr. glue | 60 | 5 | 94.2 | 91.6 | |
| 43 | .045 | .08 | | do | 60 | 5 | 95.1 | 100.0 | |
| 44 | .045 | .08 | .5Cu | do | 60 | 5 | 99.2 | 99.9 | |
| 45 | .045 | .08 | .7Sb<br>.5Cu | 2 gr. casein | 60 | 5 | 95.6 | 91.6 | |

EXAMPLE 46

1000 cc. of an indium solution having the following analyses was prepared:

$$In = 49.3 \text{ gms./l.}$$
$$Cl^- = 41.3 \text{ gms./l.}$$
$$H_2SO_4 = 10 \text{ gms./l.}$$
$$Pb = 0.045 \text{ gms./l.}$$
$$Sn = 0.08 \text{ gms./l.}$$
$$Cu = 0.5 \text{ gms./l.}$$

0.6 gram of aluminum powder was added to the solution which then was stirred for one-half hour while maintaining its temperature at about 25° C. At the end of this period, the solution was filtered and heated to 60° C. after which 0.6 gram of aluminum powder was again added and the stirring and filtering were repeated while maintaining the temperature at 60° C. The filtrate was then adjusted to 40–50° C. and to it were added 11 grams of aluminum powder. After stirring for one-half hour at this temperature, the solution was filtered and the wet metallic precipitate that was recovered was treated with a caustic solution in the manner set forth in Exbe obtained by hydrometallurgical treatment of an indium-bearing zinc calcine or zinc oxide. It may also be obtained by acid leaching the slag resulting from the pyrometallurgical refining of a lead alloy containing indium. The method of the present invention, however, is equally applicable to the treatment of other indium-bearing solutions otherwise obtained.

As previously stated, the invention may be practiced with any impure indium-bearing solution containing any amount of difficultly removable metal or metals dissolved therein. In general, it is desirable that the total concentration of the difficultly removable metals dissolved in the impure solution be less than the concentration of the indium therein. Generally, a solution is preferred which contains about 10 to 100 grams per liter of dissolved indium and a total concentration of difficultly removable metals not in excess of about 2 grams per liter. An indium product containing less than 0.1% of difficultly removable metals and a little as less than .001% of each then may be readily recovered from the process.

The present invention may be embodied in other specific forms without departing from the spirit or essential attributes thereof and it is therefore desired that

What is claimed is:

1. A process for removing more than 80% of the tin present in an impure mineral acid solution of indium having 10–100 grams per liter of dissolved indium and less than about 0.5 gram per liter of dissolved tin as an impurity which comprises adding to the solution a metal higher than thallium in the electromotive series of metals in amounts of 5–15% of the equivalent weight of the indium in said solution, agitating the solution for a period of time not exceeding about one hour, maintaining said solution at a temperature in the range of about 40–80° C. during the addition and agitation, thereby to precipitate more than 80% of the dissolved tin by galvanic precipitation, and thereafter promptly separating the thus formed precipitate from the solution.

2. A process according to claim 1 in which there is formed in said solution prior to said separation step a precipitate of a material selected from the group consisting of barium sulfate, strontium sulfate, and mixtures thereof thereby inhibiting dissolving of the galvanically precipitated tin.

3. A process according to claim 1 in which a proteinaceous material is added to said solution prior to said separation step thereby inhibiting dissolving of the galvanically precipitated tin.

4. A process for removing more than 98% of the tin present in an impure mineral acid solution of indium having 10–100 grams per liter of dissolved indium and less than about 0.5 gram per liter of dissolved tin as an impurity which comprises adding to the solution a powdered metal higher than thallium in the electromotive series of metals selected from the group consisting of aluminum, magnesium, zinc and maganese in amounts of about 5–15% of the equivalent weight of the indium in said solution, agitating the solution for a period of time not in excess of about one-half hour in the presence in the solution of metallic copper and antimony, maintaining said solution at a temperature in the range of about 50–65° C. during said addition and agitation, thereby to precipitate more than 98% of the dissolved tin by galvanic precipitation, and thereafter promptly separating the thus formed precipitate from the solution.

5. A process according to claim 4 in which there is formed in said solution prior to said separation step a precipitate of a material selected from the group consisting of barium sulfate, strontium sulfate and mixtures thereof thereby inhibiting dissolving of the galvanically precipitated tin.

6. A process according to claim 4 in which glue is added to said solution prior to said separation step thereby inhibiting dissolving of the precipitated tin.

References Cited in the file of this patent

UNITED STATES PATENTS

| Number | Name | Date |
|---|---|---|
| 1,065,678 | French | June 24, 1913 |
| 2,192,154 | Schuermann et al. | Feb. 27, 1940 |
| 2,271,970 | Doran et al. | Feb. 3, 1942 |
| 2,471,952 | Griffith et al. | May 31, 1949 |
| 2,509,916 | Griffith et al. | May 10, 1950 |

FOREIGN PATENTS

| Number | Country | Date |
|---|---|---|
| 1,563 | Great Britain | 1877 |

OTHER REFERENCES

Kolthoff et al.: "Textbook of Quantitative Inorganic Analysis," MacMullan Co., 2nd ed. (1947), page 111.

Sandell, E. B.: "Colorimetric Determination of Traces of Metals," Interscience Publisher, Ltd., London, 2nd ed. (1950), pages 20–26.

Handbook of Chemistry and Physics, Chemical Rubber Publishing Co., 28th ed. (1944), page 1380.

Latimer, W. M.: "Oxidation Potentials," Prentice-Hall, Inc., New York (1938), pages 294–296.

Hahn, O.: "Applied Radiochemistry," Cornell Univ. Press, Ithaca, N. Y. (1936), pages 65 and 66.